United States Patent [19]
Ruka et al.

[11] Patent Number: 5,908,713
[45] Date of Patent: Jun. 1, 1999

[54] SINTERED ELECTRODE FOR SOLID OXIDE FUEL CELLS

[75] Inventors: Roswell J. Ruka, Pittsburgh, Pa.; Kathryn A. Warner, Bryan, Tex.

[73] Assignee: Siemens Westinghouse Power Corporation, Orlando, Fla.

[21] Appl. No.: 08/934,884

[22] Filed: Sep. 22, 1997

[51] Int. Cl.$^6$ .................................................. H01M 8/10
[52] U.S. Cl. ................................ 429/31; 429/33; 429/40; 429/41; 429/44; 429/45; 29/623.1; 29/623.4; 29/623.5; 427/115
[58] Field of Search .................................. 429/30, 31, 33, 429/40, 41, 44, 45; 29/623.1, 623.4, 623.5; 427/115

[56] References Cited

U.S. PATENT DOCUMENTS

| | | | |
|---|---|---|---|
| 4,597,170 | 7/1986 | Isenberg | 29/623.5 |
| 4,609,562 | 9/1986 | Isenberg et al. | 427/8 |
| 4,861,345 | 8/1989 | Bowker at al. | 29/623.1 |
| 4,971,830 | 11/1990 | Jensen | 427/34 |
| 5,021,304 | 6/1991 | Ruka et al. | 429/40 |
| 5,035,962 | 7/1991 | Jensen | 429/40 |
| 5,217,822 | 6/1993 | Yoshida et al. | 429/40 |
| 5,227,258 | 7/1993 | Ito et al. | 429/40 |
| 5,474,800 | 12/1995 | Matsuzaki et al. | 427/115 |
| 5,543,239 | 8/1996 | Virkar et al. | 429/40 |

OTHER PUBLICATIONS

Minh, "Ceramic Fuel Cells", *J. Am. Ceram. Soc.* 76 [3] 563–88 (1993). No month available.

Majumdar et al., "Stress and Fracture Behavior of Monolithic Fuel Cell Tapes", *J. Am. Ceram. Soc.* 69 [8] 628–633 (1986). No month available.

Dees et al., "Conductivity of Porous Ni/ZrO$_2$–Y$_2$O$_3$ Cermets", *J. Electrochem. Soc.*, 134 [9,] 2141–2146 (1987). No month available.

Mogensen et al., "Relations Between Performance and Structure of Ni–YSZ–Cermet SOFC Anodes", Proceedings of the Fourth International Symposium on Solid Oxide Fuel Cells (SOFC–IV), Proceedings vol. 95–1, pp. 657–666 (1995).

Itoh et al., "Sintering Behavior and Performance of Anode Materials for SOFC", Proceedings of the Fourth International Symposium on Solid Oxide Fuel Cells (SOFC–IV), Proceedings vol. 95–1, pp. 639–648 (1995).

Iwata et al., "Development of Substrate Type Planar 10–Cell Stack SOFC: Stack Performance and Lifetime Characteristics", Proceedings of the Third International Symposium on Solid Oxide Fuel Cells, Proceedings vol. 93–4, pp. 792–800 (1993).

*Primary Examiner*—Bruce F. Bell

[57] ABSTRACT

A solid oxide fuel cell fuel electrode is produced by a sintering process. An underlayer is applied to the electrolyte of a solid oxide fuel cell in the form of a slurry, which is then dried. An overlayer is applied to the underlayer and then dried. The dried underlayer and overlayer are then sintered to form a fuel electrode. Both the underlayer and the overlayer comprise a combination of electrode metal such as nickel, and stabilized zirconia such as yttria-stabilized zirconia, with the overlayer comprising a greater percentage of electrode metal. The use of more stabilized zirconia in the underlayer provides good adhesion to the electrolyte of the fuel cell, while the use of more electrode metal in the overlayer provides good electrical conductivity. The sintered fuel electrode is less expensive to produce compared with conventional electrodes made by electrochemical vapor deposition processes. The sintered electrodes exhibit favorable performance characteristics, including good porosity, adhesion, electrical conductivity and freedom from degradation.

40 Claims, 4 Drawing Sheets

SINTERED ELECTRODE FOR SOLID OXIDE FUEL CELLS

GOVERNMENT CONTRACT

The United States Government has rights in this invention pursuant to Contract No. DE-FC21-91MC28055 awarded by the U.S. Department of Energy.

BACKGROUND OF THE INVENTION

1. Field of the Invention

The present invention relates to electrodes for solid oxide electrochemical cells and more specifically to a method of fabricating electrodes on solid oxide electrochemical cells by sintering. The electrochemical cells may include fuel cells, electrolyzers and sensors that operate on the basis of electromotive force measurement and/or current measurement and which comprise a solid oxide electrolyte and attached electrodes. Although this invention is primarily directed toward the fabrication of electrodes on fuel cells, it may also be used to fabricate electrodes on a variety of other electrochemical devices.

2. Background Information

Solid oxide fuel cells (SOFCs) are high temperature, electrochemical devices fabricated primarily from oxide ceramics. Typically, they contain an oxygen ion conducting solid electrolyte, such as stabilized zirconia. The electrolyte is usually a thin dense film which separates two porous electrodes comprising an anode and a cathode. The cathode, which is maintained in an oxidizing atmosphere, is usually oxide doped for high electrical conductivity, such as strontium doped lanthanum manganite. The anode, on the other hand, is maintained in a reducing atmosphere and is usually a cermet such as nickel-zirconia. Finally, an interconnection is usually employed which is a dense, electronically conducting oxide material which is stable in both reducing and oxidizing environments, such doped lanthanum chromite. The interconnection is deposited on a cell as a thin gas-tight layer in such a manner that it permits the anodes and cathodes of adjacent cells to be electrically connected in series. The gas-tightness of the interconnection, in combination with that of the electrolyte, insures that the entire cell is gas-tight, preventing mixing of the anode and cathode atmospheres.

Solid oxide cells can be operated in either an electrolysis mode or in a fuel cell mode. In an electrolysis mode, DC electrical power and steam or carbon dioxide or mixtures thereof are supplied to the cell which then decomposes the gas to form hydrogen or carbon monoxide or mixtures thereof, as well as oxygen. In the fuel cell mode, the cell operates by electrochemically oxidizing a gaseous fuel such as hydrogen, carbon monoxide, methane or other fuels to produce electricity and heat.

Nickel plus yttria-stabilized zirconia cermet fuel electrodes have been studied and used for many years as a means to improve thermal expansion match of the anode and electrolyte, and to minimize the effect of oversintering of nickel, which can result in poorer adherence due to a reduction of points of contact of nickel particles with the electrolyte, poorer electrochemical performance, and separation of the anode from the electrolyte during thermal cycles which can occur during fabrication and maintenance procedures. One type of Ni/YSZ cermet used in solid oxide fuel cells is made by coating a porous nickel particle layer covering the electrolyte with a layer of yttria-stabilized zirconia by an electrochemical vapor deposition (EVD) process at elevated temperature. This creates a zirconia skeleton encasing the nickel particles, giving a cermet that adheres tightly to the electrolyte and prevents spalling of the nickel from the electrolyte. This EVD process provides an excellent anode, but it is desirable to fabricate the anode with a less costly process.

The use of nickel-zirconia cermet anodes produced by EVD on solid oxide electrolyte fuel cells is exemplified in U.S. Pat. No. 4,490,444 to Isenberg, which provides an anode that is compatible in chemical, electrical and physical-mechanical characteristics such as thermal expansion with the solid oxide electrolyte to which it is attached. U.S. Pat. No. 4,597,170 to Isenberg addresses bonding and thermal expansion problems between the anode and solid oxide electrolyte by use of a skeletal embedding growth of, for example, ionically conducting zirconia doped with minor amounts of yttria. The skeletal growth extends from the electrolyte/anode interface into a porous nickel layer. U.S. Pat. No. 4,582,766 to Isenberg discloses oxidizing the nickel in a cermet electrode to form a metal oxide layer in order to reduce gas diffusion overvoltages.

Although attempts have been made at producing cermet anodes by low-cost sintering techniques rather than EVD processes, such sintered anodes often deteriorate during operation, which may be related to continued sintering, poor adherence to the electrolyte at useful anode sheet resistance values, and low porosity at suitable resistivity values. Conventional sintering processes are disclosed in U.S. Pat. Nos. 4,971,830 and 5,035,962 to Jensen.

Each of the patents cited above is incorporated herein by reference.

Despite the foregoing efforts, there is still a need for a low cost sintering process for the fabrication of anode structures which eliminates the need for electrochemical vapor deposition, while providing the desired combination of conductivity, adherence, electrochemical performance and stability over a long period of time.

SUMMARY OF THE INVENTION

The present invention provides an improved process for forming electrodes for solid oxide cells which avoids electrochemical vapor deposition processes, and which produces electrodes having favorable porosity, conductivity and adherence characteristics which do not deteriorate over thousands of hours of operation.

An object of the present invention is to provide a method of forming a fuel electrode on an electrolyte of a solid oxide fuel cell (SOFC) by applying an undercoat slurry to the electrolyte, drying the undercoat slurry, applying an overcoat slurry to the dried undercoat slurry, drying the overcoat slurry, and sintering the undercoat and overcoat to form the fuel electrode. The undercoat and overcoat slurries comprise mixtures of electrode metal and stabilized zirconia, and optionally small amounts of titania and ceria suspended in organic solvents. The electrode metal may comprise nickel, while the zirconia constituent may comprise yttria-stabilized zirconia. The overcoat preferably has a higher weight ratio of electrode metal to stabilized zirconia in comparison with the undercoat. The overcoat thus provides improved electrical conductivity, while the undercoat provides improved adherence to the electrolyte. An alternative overcoat layer contains nickel, but substitutes a calcium aluminate composition, preferably $CaO \cdot 6Al_2O_3$ or a composition near the empirical formulation $12CaO \cdot 7Al_2O_3$, for the yttria-stabilized zirconia.

Another object of the present invention is to provide a slurry for deposition on an electrolyte of a solid oxide cell.

The slurry comprises a suspension of electrode metal, or metal plus the corresponding metal oxide, stabilized zirconia and, optionally, a sintering aid such as $TiO_2$ in an organic solvent containing an organic binder polymer such as polyvinyl butyryl.

Another object of the present invention is to provide a sintered fuel electrode of a solid oxide fuel cell (SOFC). The sintered fuel electrode includes an undercoat comprising a combination of sintered small particle size dendritic electrode metal such as nickel (preferably less than 2 to 3 $\mu$m diameter powder) and stabilized zirconia which is in contact with, and has excellent adherence to, the electrolyte of the fuel cell. The sintered fuel electrode further includes an overcoat in contact with the undercoat comprising a combination of the same or similar small size sintered dendritic electrode metal such as nickel and stabilized zirconia. The overcoat preferably has a greater weight ratio of electrode metal to stabilized zirconia than the undercoat to provide improved conductivity. The sintered fuel electrode may have a thickness similar to or somewhat greater than conventional electrodes produced by EVD processes, and possesses a combination of favorable porosity, conductivity, adherence, thermal expansion and freedom from degradation.

These and other objects of the present invention will become more apparent from the following description.

DETAILED DESCRIPTION OF THE PREFERRED EMBODIMENTS

Figure 1:
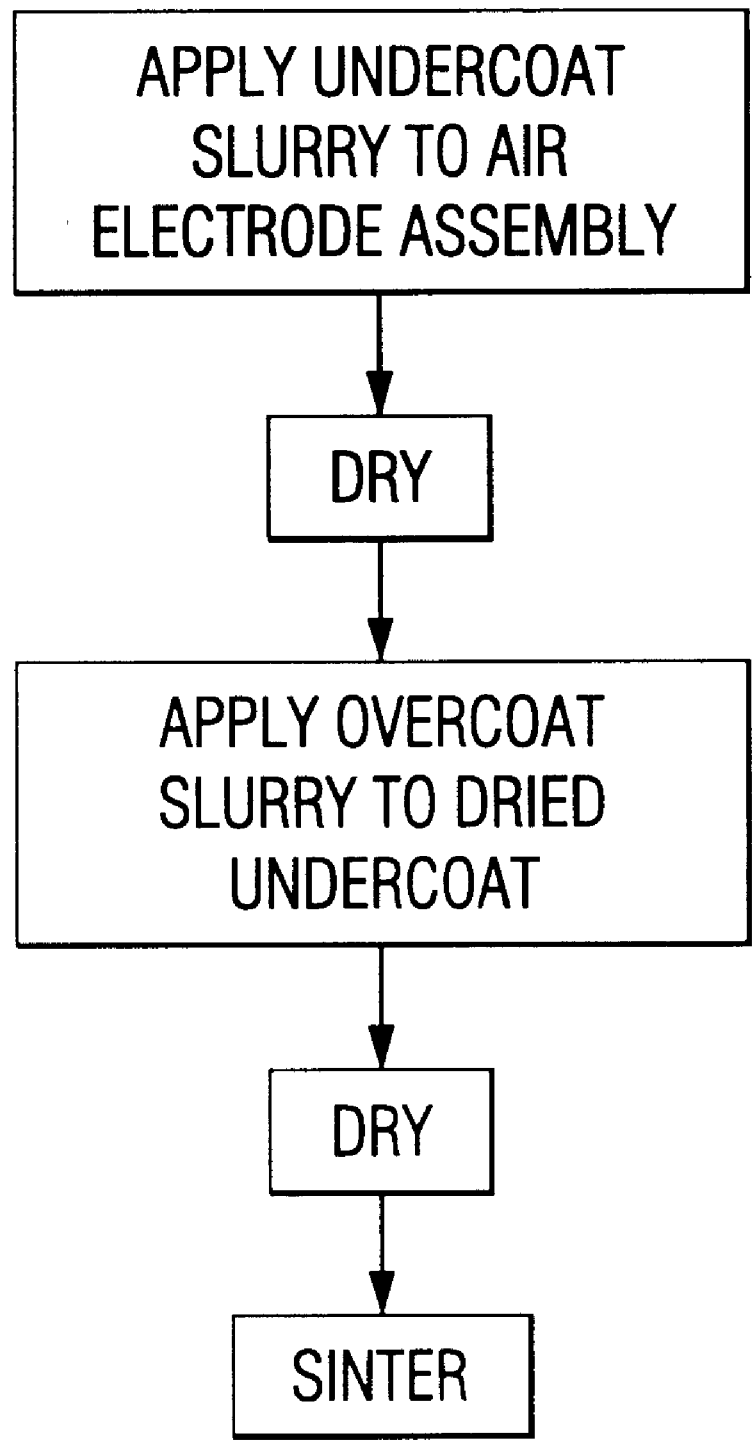
FIG. 1 is a schematic flow diagram illustrating a sintering process for producing a fuel electrode in accordance with an embodiment of the present invention.

The anode of a solid oxide fuel cell performs two main functions. It acts as an electron current collector (or distributor of electrons if the fuel cell is operated in the electrolysis mode) and provides a large number of sites for electrochemical reactions at or near the electrode/electrolyte interface. The to electrode must collect the electrons liberated during the electrochemical oxidation of the fuel and provide a low resistance path for electron current flow to either a series connected fuel cell or an external power lead. To obtain the lowest electrode resistance and maximum power from a fuel cell, the current collector within an anode should be metallic and should be relatively porous (preferably 30 to 50 percent).

Another important function of the anode is to provide sites where the electrochemical oxidation (or reduction if the fuel cell is operated in the electrolysis mode) of the fuel can occur. The microstructural requirements of such sites are stringent. They are locations near the anode electrolyte interface where oxygen ions delivered by the electrolyte, gaseous fuel from the fuel stream and an electronic path to the electron current collector are simultaneously in contact.

In accordance with the present invention, a sintered anode or fuel electrode is provided which includes an underlayer comprising a combination of metal and zirconia in contact with the electrolyte of the fuel cell, and an overlayer which likewise comprises a combination of metal and zirconia covering the underlayer. The underlayer provides good adherence to the electrolyte, and a large number of sites for electrochemical reactions, while the overlayer provides improved electrical conductivity. This is achieved by adjusting the ratio of electrode metal to stabilized zirconia in each of the layers. For example, the final underlayer may have a metal to zirconia volume ratio of from about 1:1 to about 2:1, while the overlayer may have a relatively high metal to zirconia volume ratio of from about 2:1 to about 4:1.

As used herein, the term "stabilized zirconia" means zirconia in which the stabilizing agent is a divalent or trivalent cation species. Useful stabilized zirconia includes calcia-stabilized zirconia, yttria-stabilized zirconia and species such as rare earth stabilized zirconias. Yttria-stabilized zirconia is particularly suitable.

The metallic component of the electrode is preferably nickel, although cobalt, cobalt/nickel alloys, other nickel alloys and platinum may be used. Nickel shall be used throughout the specification in order to simplify description, but the invention is not limited to nickel.

The term "dendritic" as used herein means chain-like structures of fine metallic powders comprising particles having rough surface projections or spikes and large surface areas, in comparison with high-density, semi-smooth particles. The surface projections of the dendritic particles promote improved bonding to adjacent particles during the sintering process of the present invention, and produce highly porous fuel electrodes having excellent electrical conductivity, electrochemical activity and adherence characteristics.

FIG. 1 illustrates an embodiment of the present invention wherein an undercoat slurry is applied to a conventional solid oxide fuel cell air electrode assembly and then dried. The air electrode assembly may, for example, comprise an inner cylindrical air electrode covered by a stabilized zirconia electrolyte. An overcoat slurry is then applied to the undercoat and dried. The underlayer and overlayer are then sintered to produce the fuel electrode. The undercoat and overcoat slurries are preferably prepared by mixing the electrode metal, titania, stabilized zirconia and organic binder polymer constituents in solid powder form, followed by admixture with a suitable solvent. Alternatively, the binder may first be dissolved in the solvent.

The electrode metal of the undercoat and overcoat slurries preferably comprises nickel having a dendritic morphology. The dendritic nickel preferably has an average particle size of from about 0.3 to about 3 microns, more preferably from about 2.2 to about 2.8 microns. A particularly suitable electrode metal is $Ni_{255}$ commercially available from NOVAMET. A portion of the nickel may optionally be substituted by NiO. This helps adjust the slurry viscosity and can help adjust porosity of the sintered fuel electrode. For example, the weight ratio of Ni to NiO may preferably range from about 10:1 to about 1:1, with a ratio of about 3.6:1 being particularly suitable.

The stabilized zirconia constituent of the undercoat and overcoat slurries preferably comprises yttria-stabilized zirconia. Yttria-stabilized zirconia comprising from about 8 to about 12 molar percent $Y_2O_3$ is preferred. For example, a composition of the formula $(Y_2O_3)_{0.08}(ZrO_2)_{0.92}$ is particularly suitable. The yttria-stabilized zirconia is preferably provided as an ultra fine powder, having an average particle size of about 0.03 micron or less. Suitable ultra fine yttria-stabilized zirconia is commercially available under the designation TZ8Y from TOSOH.

For the sintered undercoat, the weight ratio of electrode metal to stabilized zirconia in the slurry preferably ranges from about 1.5:1 to about 3:1, and more preferably is about 2:1. The amount of stabilized-zirconia present in the underlayer is selected in order to provide adequate adherence between the fuel electrode and the electrolyte, while not decreasing electrical conductivity to an undesired extent.

The weight ratio of electrode metal to yttria-stabilized zirconia in the sintered overcoat slurry preferably ranges from about 3:1 to about 6:1, and preferably is about 4.5:1 or 5:1. Similar ratios of nickel and calcium aluminate may be used in the overcoat as an alternative to the nickel plus stabilized zirconia combination. The respective amounts of electrode metal and stabilized-zirconia in the overcoat are selected in order to provide adequate adherence between the undercoat and overcoat, provide sufficient electrical conductivity and minimize thermal expansion mismatch with the electrolyte. The ratio of electrode metal to stabilized-zirconia in the overcoat is preferably greater than the ratio of electrode metal to stabilized-zirconia in the undercoat. By using more electrode metal in the overcoat, the overall electrical conductivity of the fuel electrode is improved, while the higher zirconia content in the undercoat provides improved adherence between the fuel electrode and the electrolyte.

In addition to the electrode metal and stabilized-zirconia, the undercoat and overcoat slurries may optionally include additional solid constituents such as a sintering aid. When a sintering aid is used, it preferably comprises from about 1 to about 5 weight percent of the solid constituents. A particularly preferred sintering aid is $TiO_2$. The use of $TiO_2$ as a sintering aid has been found to improve interparticle contact of nickel which increases the electrical conductivity of the resulting fuel electrodes. The $TiO_2$ may have an average particle size of less than about 5 microns, more preferably from about 0.1 to about 1 micron. Ceria ($CeO_2$) may optionally be present in amounts up to about 6 weight percent of the solid constituents, more preferably from about 1.5 to about 2 weight percent. The presence of ceria in the fuel electrode may improve sulfur tolerance during operation of the solid oxide fuel cell.

In forming the undercoat and overcoat slurries, the solid constituents are mixed in the appropriate ratios by any suitable method. For example, the solid constituents may be mixed in a container including media balls, such as stabilized $ZrO_2$, in order to help break agglomerates and promote fluidization. The mixed solids may then be mixed with a suitable solvent containing an organic binder such as polyvinyl butyryl by means such as ball milling in order to form a slurry comprising a suspension of the solid particles. The ratio of solid particles to solvent is adjusted in each of the undercoat and overcoat slurries to adjust viscosity in order to facilitate application of the slurries. To provide the desired drying characteristics, the ratio of the two solvents is adjusted, which controls evaporation. The weight ratio of solid particles to solvent preferably ranges from about 1.5:1 to about 3:1, preferably from about 1.6:1 to about 2.5:1.

The solvent for each of the undercoat and overcoat slurries is preferably nonaqueous. The use of organic solvents rather than water has been found to improve the electrical conductivity of the resulting fuel electrodes for a given sintering time and temperature. The solvent may comprise a mixture of organic solvents having different vapor pressures. A solvent of relatively high vapor pressure may be used to promote rapid partial evaporation of solvent to prevent dripping, while a solvent of lower vapor pressure may be used to avoid cracking during drying of the slurries. A particularly suitable low vapor pressure solvent is 2-butoxyethanol. Particularly suitable high vapor pressure solvents include alcohols such as 1-propanol, isopropanol and ethyl alcohol. The ratio of low vapor pressure solvent to high vapor pressure solvent may be adjusted to any desired level to attain desired spray characteristics. Particularly suitable organic solvents comprise 2-butoxyethanol, propanol or mixtures thereof. A solvent mixture containing about 57 weight percent 2-butoxyethanol and 43 weight percent propanol is particularly suitable for spraying, while 1-propanol alone is particularly suitable for dip coating.

Polymeric binders may be added to the solvents in order to adjust the viscosity of the slurries, increase green strength and control porosity during subsequent processing. Suitable polymeric binders include polyvinyl butyryls such as those sold under the designations Butvar 79 and Butvar 98 by Monsanto. The chain length of the polymeric binders may be varied to help adjust the viscosity of the slurries. A dispersant may also be added to the solvent in order to improve the dispersion of the solid particles suspended therein. A suitable dispersant is sold under the designation KD4 by ICI Americas Inc.

The viscosity of each slurry is preferably controlled in order to aid in the application of the slurry by spraying, dipping and the like. For spray application, the slurries preferably have a viscosity giving a draining time of from about 18 to about 60 seconds as measured by a No. 2 Zahn cup at 25° C. For dip application, the viscosity of the slurries is typically higher. The viscosity of the slurries may be controlled by the appropriate selection of solvent composition, the use of polymeric binders, by adjusting the ratio of solvent to solid particles and the ratio of nickel to nickel oxide and the use of thickeners such as polyacrylic acids.

The undercoat and overcoat slurries may be applied by any suitable technique such as spraying, dipping and the like. Once the undercoat and overcoat slurries are applied, the small quantity of remaining solvent evaporates rapidly and in about an hour or more the fuel electrode can be sintered in a reducing atmosphere. Typically, an atmosphere of 1 percent $H_2$, 3 percent $H_2O$ and 96 percent $N_2$ is used. The electrode is then heated at about 3 to 5° C./min. to about 1300 to 1325° C., held 2 to 4 hours and cooled. Heating at lower temperatures or shorter hold times may result in lower conductivity.

Figure 2:
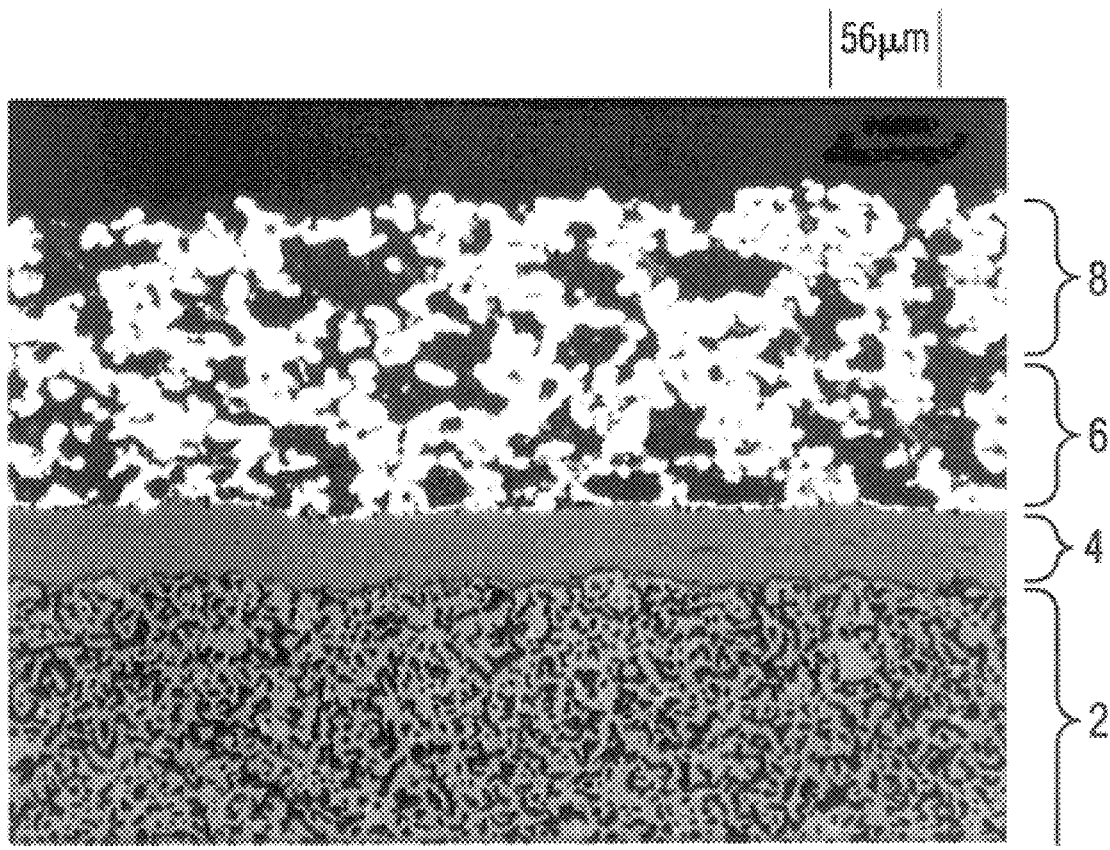
FIG. 2 is a photomicrograph of a cross-section of a solid oxide fuel cell, including a sintered fuel electrode produced in accordance with a two-layer embodiment of the present invention.

FIG. 2 is a photomicrograph showing a cross-section of a cylindrical solid oxide fuel cell having a sintered fuel electrode produced in accordance with the present invention. The fuel cell comprises a conventional tubular inner air electrode 2 and a thin electrolyte layer 4. The air electrode 2 may, for example, comprise strontium or calcium doped lanthanum manganite with or without other additives such as Ce, Ni, Cr and rare earths, while the electrolyte may, for example, comprise stabilized zirconia. A sintered fuel electrode comprising an underlayer 6 and an overlayer 8 covers the electrolyte 4.

As shown in FIG. 2, both the underlayer 6 and overlayer 8 of the sintered fuel electrode include sintered nickel particles, shown by the light regions, forming a porous interconnected structure. The porosity of the underlayer 6 and overlayer 8 preferably ranges from about 30 to about 60 volume percent, more preferably from about 30 to about 50 volume percent. The thickness of the underlayer 6 preferably ranges from about 30 to about 80 microns, more preferably from about 40 to about 50 microns. The overlayer 8 preferably has a thickness ranging from about 30 to about 90 microns, more preferably from about 40 to about 60 microns. The overall thickness of the sintered fuel electrode is preferably minimized in order to reduce mechanical stress between fuel electrode and electrolyte. Preferably, the total thickness of the fuel electrode is less than about 180 microns, more preferably from about 100 to about 150 microns. The fuel electrode preferably has a sheet resistance at 1,000° C. of 0.03$\Omega$ cm$^2$±0.01.

The underlayer of the sintered fuel electrode preferably has a metal to zirconia volume ratio of from about 1:1 to about 2:1, while the overlayer preferably has a metal to zirconia volume ratio of from about 2:1 to about 4:1.

A typical process for forming a sintered fuel electrode consists of combining the dendritic nickel, NiO, $TiO_2$ and $CeO_2$ powders with a solution of polyvinyl butyryl and a dispersant (e.g., KD4) in 1-propanol, 2-butoxyethanol or their mixtures and fluidizing and dispersing the solids by ball milling or other means such as prolonged shaking, passing through a high shear device and the like. The resulting fluid is then applied to the electrolyte of a tubular SOFC by spraying or by dipping, allowed to dry and sintered at 1,300 to 1,325° C. for 1 to 4 hours in a reducing atmosphere such as 1 percent $H_2$, 3 percent $H_2O$, 96 percent $N_2$. The water is present to oxidize the polymer constituent (i.e., polyvinyl butyryl).

Sintered fuel electrodes have been prepared in this way which give the combined properties of good conductivity, porosity (35 to 42 percent typically) excellent adherence to the zirconia electrolyte and freedom from degradation over a testing period of greater than 3,800 hours at 1,000° C. These properties equal those of the best previous type of anode for a SOFC in which the cermet is formed by electrochemical vapor depositions (EVD) of the zirconia in a porous nickel layer, which is a much more expensive process due to the high capital cost of the EVD equipment and labor required. Conventional sintered fuel electrodes do not achieve this favorable combination of properties, which in particular includes freedom from degradation.

Figure 3:
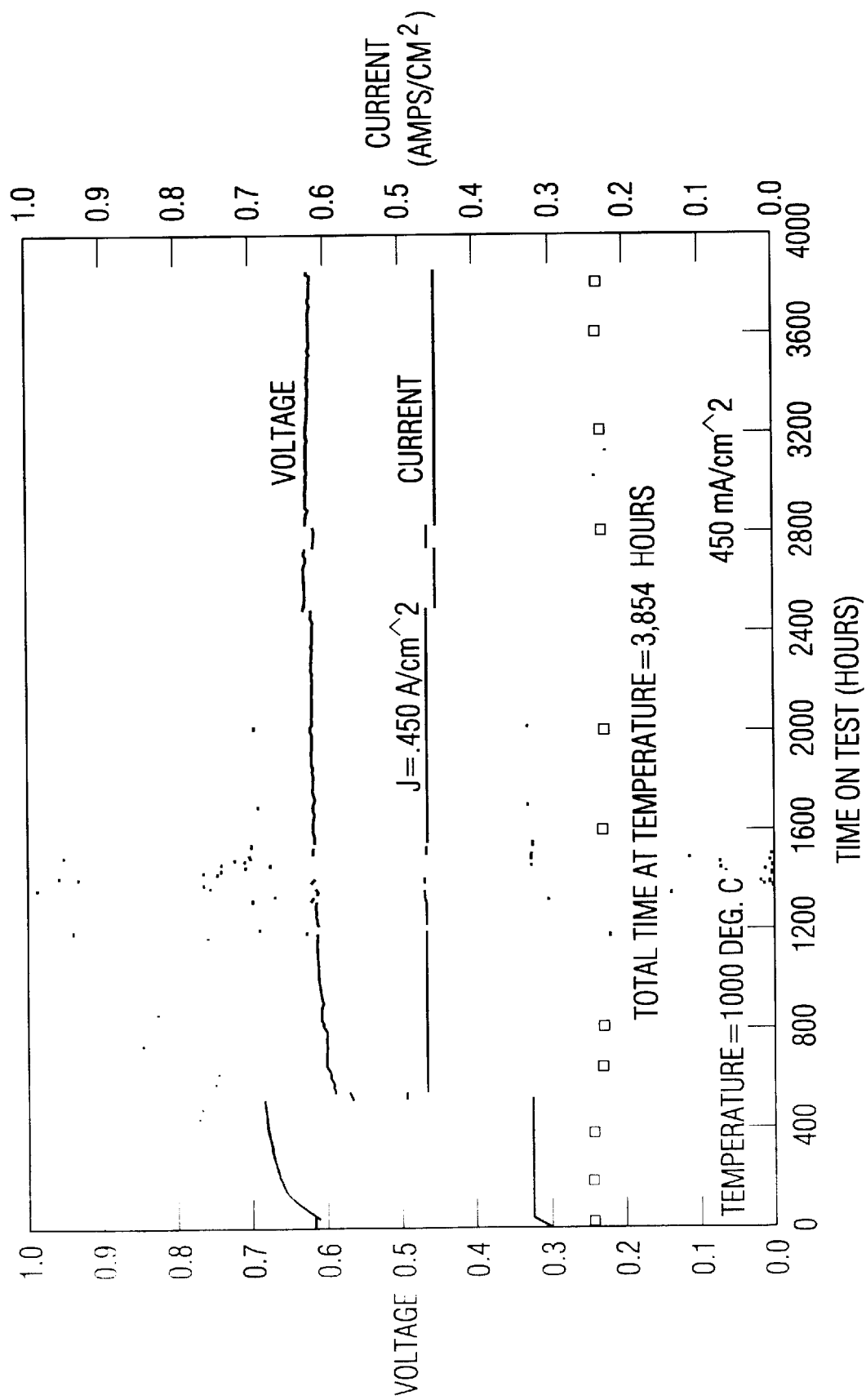
FIG. 3 is a performance curve at a normal operating temperature of about 1000° C. for a solid oxide fuel cell having a sintered fuel electrode produced in accordance with a two-layer embodiment of the present invention, showing no decrease in voltage with time for a given current.

FIG. 3 is a solid oxide fuel cell performance curve showing no decrease in voltage for a given current after an initial break-in over a 3800 hour test run. The cell was thermal cycled six times from 1,000 to 600° C. and six times from 1,000 to approximately 200° C., with no loss of performance.

Figure 4:
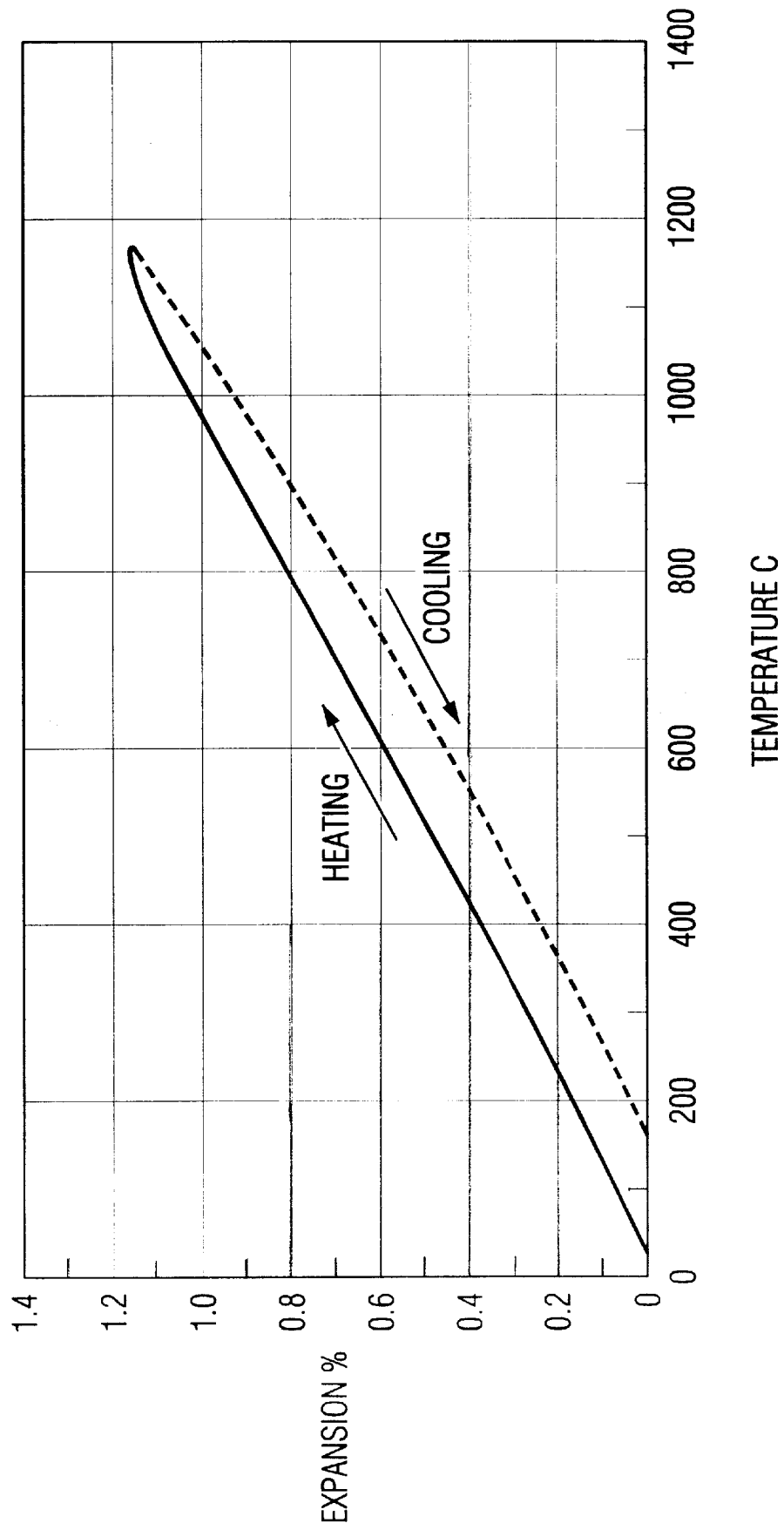
FIG. 4 is a plot of thermal expansion data for a sintered fuel electrode undercoat produced in accordance with an embodiment of the present invention.

FIG. 4 is a plot of thermal expansion data for a sintered fuel electrode undercoat produced in accordance with the present invention. The thermal expansion of about 10.5×10$^{-6}$/° C. corresponds well with that of the yttria-stabilized zirconia electrolyte material which likewise has a thermal expansion of about 10.5×10$^{-6}$/° C. FIG. 4 shows the percent expansion of a one inch length by one-fourth inch width sample of a sintered fuel electrode undercoat without the overcoat upon heating from 25° C. to about 1,000° C. Above this temperature, the thin (<100 microns) sample begins to bend as a result of a small pressure exerted by the push rod of the dilatometer measuring device. Upon cooling below about 900° C., the bending largely ceases due to the lower creep rate of the cermet at lower temperatures.

The method of the present invention provides several advantages over prior art practices. The process is less labor-intensive and has less capital cost in comparison with conventional EVD processes, resulting in lower manufacturing costs. The resulting sintered fuel electrodes provide excellent thermal expansion match at the electrode/electrolyte interface and provide excellent adherence. In addition, the sintered electrodes provide good electrical conductivity without excessive electrode thickness. The sintered electrodes also provide advantageous electrochemical activity at the electrolyte interface and substantially no degradation of cell voltage at constant current and operating times greater than 3,800 hours.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A method of forming a fuel electrode on an electrolyte of a solid oxide fuel cell, the method comprising:

forming an undercoat slurry comprising a first solvent and a first mixture including an electrode metal and stabilized zirconia;

forming an overcoat slurry comprising a second solvent and a second mixture including an electrode metal and at least one oxide selected from the group consisting of stabilized zirconia and calcium aluminate, wherein the second mixture has a higher weight ratio of electrode metal to oxide than the weight ratio of electrode metal to stabilized zirconia of the first mixture;

applying the undercoat slurry directly to the electrolyte;

drying the undercoat slurry;

applying the overcoat slurry directly to the dried undercoat slurry;

drying the overcoat slurry; and sintering the dried undercoat and overcoat slurries to form a two-layer fuel electrode in which the undercoat is sintered to the electrolyte and the overcoat is sintered to the undercoat, wherein the volume ratio of the electrode metal to the stabilized zirconia in the undercoat is at least about 1:1.

2. The method of claim 1, wherein the electrode metal of the first and second mixtures comprises nickel.

3. The method of claim 2, wherein the nickel has a dendritic morphology.

4. The method of claim 2, wherein the nickel is partially substituted by NiO.

5. The method of claim 4, wherein the weight ratio of Ni to NiO is from about 10:1 to about 1:1.

6. The method of claim 1, wherein the first mixture comprises from about 40 to about 50 weight percent dendritic nickel.

7. The method of claim 6, wherein the first mixture has a weight ratio of nickel to stabilized-zirconia of from about 1.5:1 to about 3:1.

8. The method of claim 1, wherein the second mixture comprises from about 50 to about 70 weight percent dendritic nickel.

9. The method of claim 8, wherein the second mixture has a weight ratio of nickel to stabilized-zirconia of from about 3:1 to about 6:1.

10. The method of claim 1, wherein the electrode metal of the first and second mixtures comprises nickel, the first mixture has a weight ratio of nickel to stabilized zirconia of from about 1.5:1 to about 3:1, and the second mixture has a weight ratio of nickel to stabilized zirconia of from about 3:1 to about 6:1.

11. The method of claim 1, wherein the stabilized zirconia comprises yttria-stabilized zirconia.

12. The method of claim 11, wherein the yttria-stabilized zirconia has an average particle size of about 0.3 micron or less.

13. The method of claim 1, wherein at least one of the first and second mixtures further comprises from about 0.5 to about 5 weight percent of a sintering aid.

14. The method of claim 13, wherein the sintering aid comprises $TiO_2$.

15. The method of claim 14, wherein the $TiO_2$ has an average particle size of less than about 5 microns.

16. The method of claim 14, wherein the $TiO_2$ has an average particle size of from about 0.01 to about 1 micron.

17. The method of claim 1, wherein at least one of the first and second mixtures further comprises from about 2 to about 8 weight percent $CeO_2$.

18. The method of claim 1, wherein the first and second solvents are nonaqueous.

19. The method of claim 1, wherein the first and second solvents each comprise a mixture of at least two organic solvents of different vapor pressure.

20. The method of claim 19, wherein the first and second solvents each consist essentially of a mixture of an alcohol and 2-butoxyethanol.

21. The method of claim 20, wherein the alcohol is 1-propanol, isopropanol or a combination thereof.

22. The method of claim 19, wherein the first and second solvents include a polymeric binder.

23. The method of claim 1, wherein the thickness of the fuel electrode is from about 80 to about 180 microns.

24. The method of claim 1, wherein the sintered undercoat has a metal to zirconia volume ratio of from about 1:1 to about 2:1, and the sintered overcoat has a metal to oxide volume ratio of from about 2:1 to about 4:1.

25. The method of claim 1 wherein the undercoat slurry comprises:
from about 30 to about 50 weight percent of a solvent comprising at least two organic solvents of different vapor pressure.

26. The method of claim 25, wherein the mixture further comprises $TiO_2$.

27. The method of claim 25, wherein the mixture further comprises $CeO_2$.

28. The method of claim 1 wherein the undercoat slurry comprises:
from about 50 to about 70 weight percent of a mixture comprising an electrode metal, stabilized zirconia, and $TiO_2$; and
from about 30 to about 50 weight percent of an organic solvent.

29. The method of claim 28, wherein the electrode metal comprises dendritic nickel.

30. The method of claim 28, wherein the mixture further comprises $CeO_2$.

31. A sintered fuel electrode of a solid oxide fuel cell comprising from about 70 to about 80 weight percent sintered dendritic nickel, from about 15 to about 25 weight percent stabilized zirconia, and from about 1 to about 5 weight percent $TiO_2$.

32. The sintered fuel electrode of claim 31, wherein the stabilized zirconia comprises yttria-stabilized zirconia.

33. The sintered fuel electrode of claim 31, further comprising from about 1 to about 8 weight percent $CeO_2$.

34. A sintered two-layer fuel electrode of a solid oxide fuel cell comprising:
an undercoat in direct contact with an electrolyte of the solid oxide fuel cell comprising sintered dendritic electrode metal and stabilized zirconia, wherein the volume ratio of the electrode metal to the stabilized zirconia in the undercoat is at least about 1:1; and
an overcoat in direct contact with the undercoat comprising sintered dendritic electrode metal and stabilized zirconia, wherein the overcoat has a greater weight ratio of electrode metal to stabilized zirconia than the undercoat and the overcoat forms the outermost layer of the fuel electrode.

35. The sintered fuel electrode of claim 34, wherein the sintered dendritic electrode metal of the undercoat and overcoat comprises nickel and the stabilized zirconia of the undercoat and overcoat comprises yttria-stabilized zirconia.

36. The sintered fuel electrode of claim 35, wherein the undercoat and overcoat further comprise from about 1 to about 4 weight percent $TiO_2$.

37. The sintered fuel electrode of claim 36, wherein the undercoat and overcoat further comprise from about 1 to about 8 weight percent $CeO_2$.

38. The sintered fuel electrode of claim 34, wherein the sintered fuel electrode has a thickness of less than about 180 microns.

39. The sintered fuel electrode of claim 34, wherein the undercoat has a thickness of from about 30 to about 75 microns and the overcoat has a thickness of from about 30 to about 75 microns.

40. The sintered fuel electrode of claim 34, wherein the undercoat has a metal to zirconia volume ratio of from about 1:1 to about 2:1, and the overcoat has a metal to zirconia volume ratio of from about 2:1 to about 4:1.

* * * * *